Sept. 30, 1952        L. F. CARTER        2,611,973
GYROCOMPASS

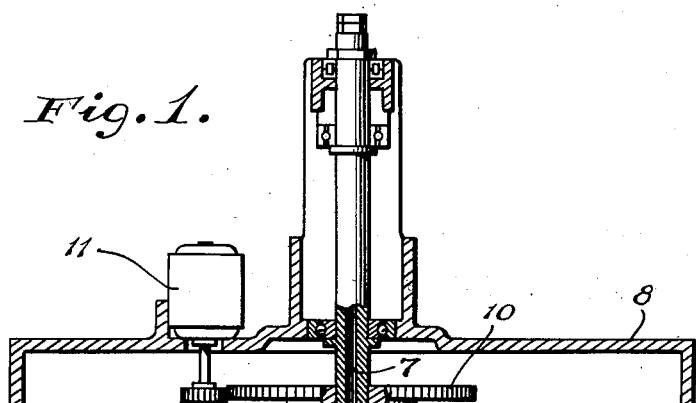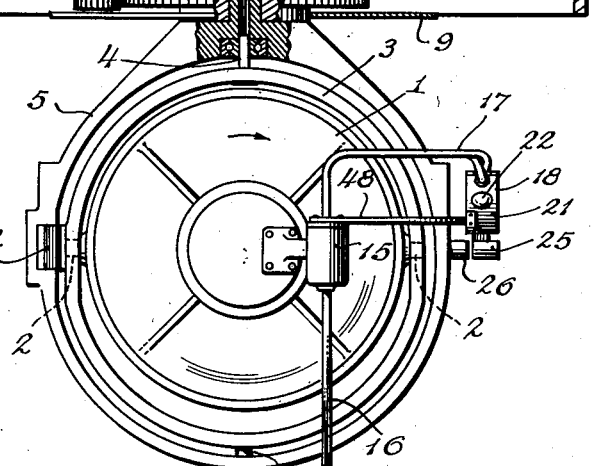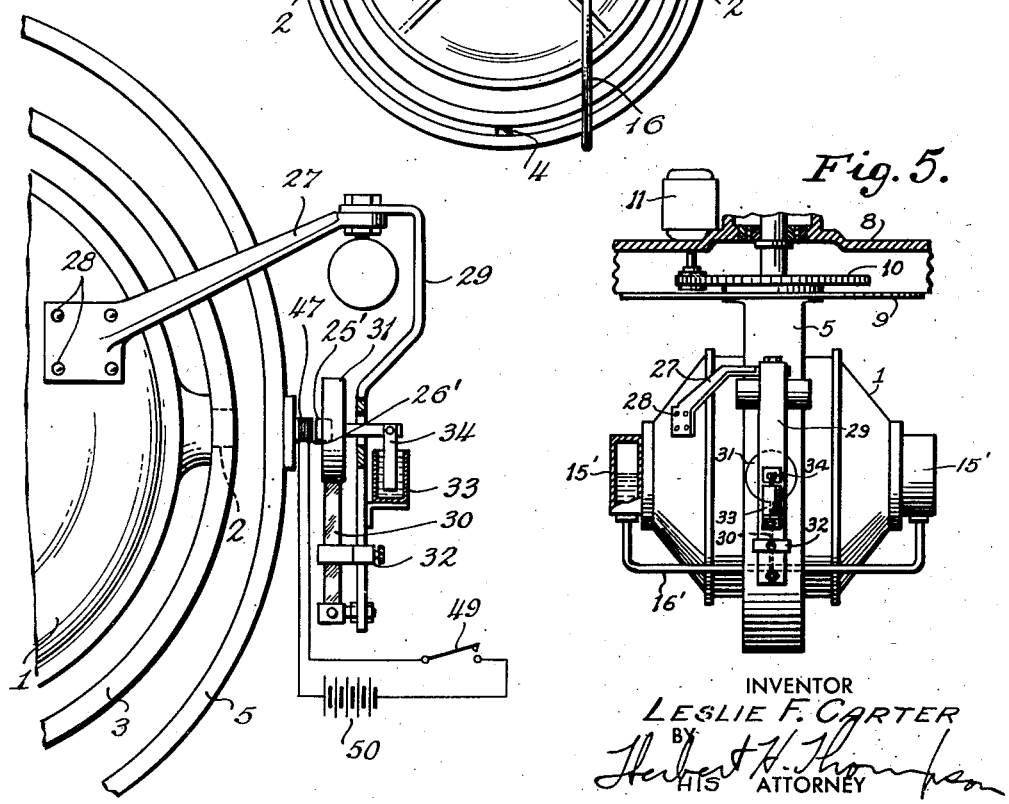

Filed Jan. 31, 1945        2 SHEETS—SHEET 2

INVENTOR
LESLIE F. CARTER
BY
HIS ATTORNEY

Patented Sept. 30, 1952

2,611,973

UNITED STATES PATENT OFFICE 2,611,973

GYROCOMPASS

Leslie F. Carter, Leonia, N. J., assignor to The Sperry Corporation, a corporation of Delaware Application January 31, 1945, Serial No. 575,451

14 Claims. (Cl. 33—226)

This invention relates to gyroscopic compasses, and has for its chief characteristic a novel method of and apparatus for damping the oscillations of the compass in azimuth after it has been deflected from the meridian. The invention can be applied to any form of gyrocompass in which such damping can be performed by exerting a suitable couple round the vertical axis so as to diminish the tilt which the gyro axle has acquired during an excursion from the meridian, and the provision of an improved means for exerting such a couple is one of the objects of the invention.

Another object of the invention is to provide a damping means which can readily be rendered inoperative at will or upon a predetermined event without moving any valves or other mechanical parts.

Other objects and advantages will become apparent from the specification, taken in connection with accompanying drawings wherein the invention is shown embodied in several concrete forms for illustrative purposes.

In the drawings,

Fig. 1 is a north elevation partly in section of a gyrocompass embodying one form of my invention;

Fig. 4 shows an alternative form of the damping device in accordance with my invention.

Fig. 5 is a side elevation of the form of gyrocompass shown in Fig. 4.

Figure 2:
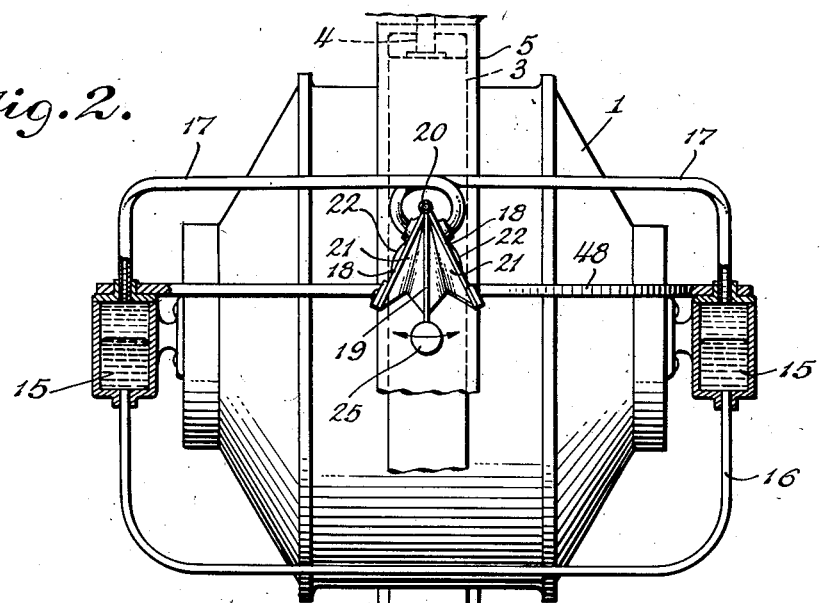
Fig. 2 is a west elevation partly in section of part of the gyrocompass shown in Fig. 1.
Figure 3:
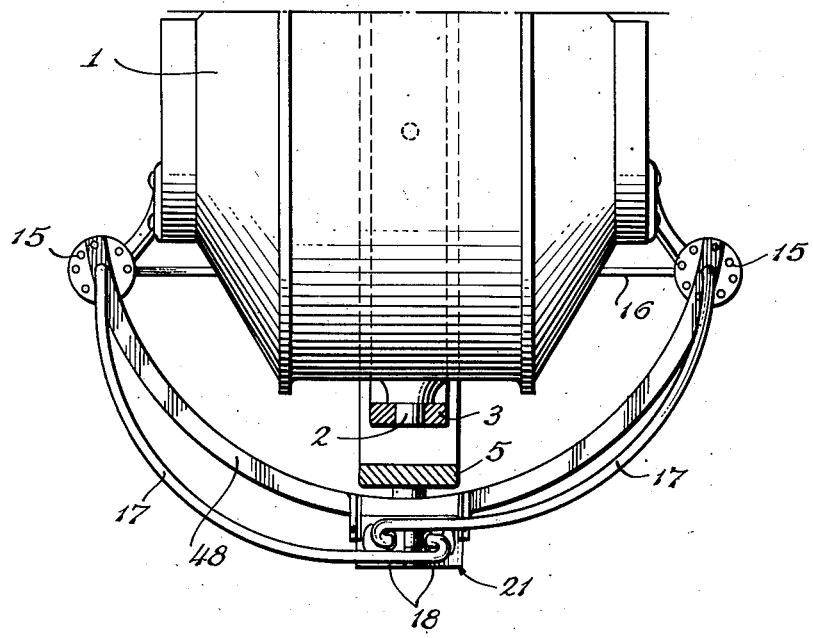
Fig. 3 is a plan view of part of the compass shown in Fig. 1.

Referring to Figs. 1, 2 and 3, the gyro rotor (not shown) is contained in the casing 1 supported on horizontal bearings 2, 2 in a vertical ring 3, which ring is itself supported in vertical guide bearings 4, 4 in a phantom or follow-up ring 5.

The gyro rotor is journaled in bearings in the casing 1, which completely surrounds it. The gyro is driven at a high speed preferably by a polyphase electric motor of which the gyro forms the rotor while the stator is bolted to the inside of the casing all in the well-known manner as disclosed, for example, by E. A. Sperry, in Patent 1,279,471, applied for on June 21, 1911, and patented September 17, 1918. The present invention however is equally applicable if the gyro is spun by an air blast or any other means. The phantom ring supports the weight of the gyroscope by a wire suspension 7 of the well known type. The phantom ring is mounted for rotation about a vertical axis in a spider 8 which is gimballed in the usual way. The phantom ring 5 carries the compass card 9 and an azimuth gear 10. A reversible electric motor 11 mounted on the spider is controlled by a sensitive follow-up transformer 12 to make the phantom ring follow all the movements of the vertical ring in azimuth so that the vertical and phantom rings are always coplanar. The gyroscope is made north-seeking by means of a gravitational or pendulous factor or element such as a mercury ballistic of any well known type which consists of two vessels 15 in this instance rigidly fixed at the north and south sides of the gyro casing respectively and connected by a pipe 16. The two vessels are partially filled with mercury, and mercury also fills the pipe 16 so that on any inclination of the gyro axle from the horizontal, mercury will flow from the high side to the low side and so give the north-seeking property to the gyrocompass.

The two vessels 15 are closed at the top and connected by overhead pipes 17, 17 which are carried round on the west outside of the phantom ring. Since the containers 15 are thus connected in a closed loop by the top and bottom pipes 16, 17, the structure may be described as a closed circuit liquid ballistic arrangement, closed to the atmosphere. These two pipes are connected, as shown, to double flexible bellows 21, 21, of which the sides 18, 18 are fixed to the gyro casing by the bracket 48 while a central partition 19 is hinged at 20 in the angle of the bellows 21 so as to be free to swing from side to side. The space in the mercury vessels 15 above the mercury, the overhead pipe 17, and the bellows are all filled with oil or similar liquid less dense than mercury, the arrangement being such that when the gyro tilts and mercury flows into the lower vessel 15, say the one on the left hand, it displaces oil which flows through the overhead pipe 17 into the right hand side of bellows 21 and thus causes the hinged partition 19 to be swung over towards the lower end of the gyro axle. The capacity of the bellows is sufficient to contain any oil displaced by the mercury under any normal conditions of working of the compass, and the arrangement therefore presents no substantial hindrance to the free flow of mercury from side to side. The bellows may be made of leather, neoprene or any other flexible material which will be impervious to and unaffected by the liquid used. Expansion blisters 22 are provided on the side of the bellows to take care of any volumetric expansion of either the mercury or oil due to heat.

The partition 19 carries at its lower end a small magnetic element which may be in the form of a permanent magnet 25 which normally lies on the axis of the horizontal bearings 2, 2. This magnet cooperates with a cooperating magnetic element 26 which may be simply a soft iron armature or another permanent magnet 26 which is fixed to the phantom ring 5 also on the line of the horizontal axis 2, 2. If two magnets are used the unlike poles should face one another. By such or equivalent means a yielding connection is provided between the gyroscope and follow-up element which exerts a torque about the vertical axis of the gyroscope upon tilt thereof, in a direction to reduce the tilt as will now be explained. Under normal conditions when magnet 25 is supported by the partition 19 in its central position, the attraction between the two magnets applies no couple to the gyroscope, but only a radial pull. Moreover, since the magnet system is centered on the axis of the horizontal bearings 2, 2 relative rotation of the gyro casing and vertical ring or phantom ring about this axis does not directly cause any couple to be applied by the magnets to the gyro. When, however, as a result of tilting of the gyro and flow of the mercury through the pipe 16 from one vessel to the other, magnet 25 has become displaced by the bellows from its central position towards north or south, the attraction between it and magnet 26 on the phantom ring will have a tangential component. Since magnet 25 is ultimately supported on the gyro casing by the partition 19, there will be a couple applied around the vertical axis of the gyro. By mounting the magnets on the west side of the gyroscope and crossing the oil pipe as shown in Fig. 2, this couple will be in the required sense to produce the necessary damping of the compass oscillations.

Although the magnet on the phantom ring and the magnet carried by the bellows may both conveniently be made as permanent magnets, only one need be a magnet and the other a soft iron armature. Also instead of a permanent magnet, I may make one as an electromagnet 26' as shown in Fig. 4 with a soft iron core and a winding 47 supplied with current from a battery or other source 50 through a switch 49 so that it can be energized or deenergized at will. The electromagnet is preferably carried on the phantom element of the compass and the cooperating part 25' carried by the bellows may consist of a soft iron armature. As is well known, all gyrocompass damping devices cause a small deviation to occur after considerable changes in the northerly speed of the ship (due to turns or speed changes), and for this reason it is customary to provide means to eliminate the damping effect while changes of speed or course are actually in progress. Such elimination is very simply effected in my damping device when an electromagnet is used, as the current energizing the magnet on the phantom is simply cut off either by hand or by an automatic switch while such changes are in progress in the manner described for instance in Patent No. 1,730,967, dated October 8, 1929, to present applicant for Turning Error Preventer for Gyrocompasses.

I have found, however, that the provision of auxiliary means for eliminating the damper when my magnetic damper is employed, is not necessary, especially when the compass is to be used on high speed-quick maneuvering craft, such as destroyers and PT boats. This is for the reason that under the action of large acceleration forces having a large N-S component due to rapid maneuvers, the displacement between the two magnets, one on the phantom and the other connected to or operated from the gravitational responsive element, is so great that the magnets become so far separated as to exert little or no attraction or repulsion between each other. That this will occur may be readily appreciated when it is remembered that the relative tilt of the gyroscope and the phantom during normal meridian seeking precession of the gyroscope is very small and the period very long, i. e., about 85 minutes, whereas during turns the ballistic deflection is always so calculated that the compass is brought to its new settling point by the time the ship reaches its new course, which in fast boats is usually less than a minute for a 180° turn. The rate of precession of the gyro, therefore, is very much greater under ballistic deflection than it is when approaching the meridian after tilt. Since the force between the two magnets decreases with the cube of the distance, it will be seen that when the magnets become separated very much, the attraction or repulsion between the same falls off very rapidly so that the damping force becomes negligible during rapid turns and changes of speed.

Fig. 4 shows an alternative form of my invention whose applicability extends to cases where the north-seeking property is given by other means than a liquid ballistic. In this form the damping means is self-contained and does not depend on a liquid ballistic 15' or other means used for producing couples round the horizontal axis. The whole damping device is shown as attached to the brackets 27 which are secured by screws 28 to the gyro casing 1. The main arm 29 of the damping device is attached to the bracket and carries at its lower end a leaf spring 30 with its plane lying east and west. Spring 30 is normally vertical and carries at its upper end a mass 31 in unstable equilibrium, the arrangement being such that on any tilt of the gyro casing 1 leaf spring 30 will also be tilted, and then bent further by the weight of the mass 31 towards north or south. A very sensitive tilt responsive device is thus provided having no bearings and hence no bearing friction and yet having a greater angular movement per unit tilt angle than such tilt angle. A yielding connection is provided between mass 31 and the phantom for the purpose of applying a torque about the vertical axis of the compass upon tilt in the proper direction to reduce the tilt. Preferably, this connection is in the form of a small permanent magnet 25' carried at the center of mass 31 which cooperates with a magnet 26' mounted on the phantom ring as in the previous example, the two magnets being normally coaxial with their common axis on the line of the horizontal bearings 2, 2. For initial adjustment of the stiffness of the spring 30 to give the desired damping ratio and sensitivity to tilt, I may provide a slidable adjusting clip 32 which is clamped on the main bar 29 and limits the working length of the spring 30 to that part which projects above clip 32.

When the operation of the magnets depends on repulsion of like poles, it is clear that two magnets must be used, one fixed to the phantom ring and one carried by the movable mass 31; but when only an attracting force is required, depending on whether the damping device is mounted on the east or west side of the compass, I may obtain the desired result with one magnet which may be an electromagnet, a permanent magnet, or a coreless solenoid on one member cooperating with a soft iron armature on the other member. The term magnet in this specification is therefore to be understood to cover all these types.

To prevent oscillations of the mass 31 on spring 30 a dash-pot 33 is provided and attached to the main bar 29. This dash-pot, which is open at the top, is partially filled with oil or other viscous liquid and a blade 34 carried by the mass 31 dips into it as shown.

Mass 31 may be made very small and light, and the northerly or southerly displacement which occurs on tilting of the gyroscope may be very small. The consequence is that the gravity couple applied by this mass round the horizontal axis of the gyroscope is negligible in comparison with the main control couple which is applied to make the compass north-seeking and which is provided by a pendulous bail, mercury ballistic 15'—15' (Fig. 5) or other means not forming part of the present invention.

It will be observed that so long as the leaf spring 30 is straight, the two magnets 25' and 26' will be on the line of the horizontal bearing and will suffer no relative displacement except relative rotation round their own axes as a direct result of tilting of the gyroscope from the vertical. The damping couple only comes into operation as a result of bending of the spring 30 and consequent displacement of the mass 31 and magnet 25' relatively to the gyro casing. Magnet 26' is shown as an electromagnet, but if desired it may be replaced by a permanent magnet as in Fig. 3.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyroscopic compass having a ballistic including connected liquid containers, the lower parts of which contain a heavy liquid which can flow between the north and south sides of the gyroscope, while the upper parts contain a light liquid, a two-part liquid container having a movable wall in circuit with said light liquid so arranged that on any displacement of the heavy liquid, said wall is displaced, a magnetic element connected to said wall so as to be laterally displaced thereby, and a cooperating magnetic element fixed on the phantom ring adjacent to said first magnetic element.

2. A damping system for damping the oscillations in azimuth of a gyroscopic compass having a gravitational factor for imparting meridian-seeking properties thereto, comprising a small pendulum carried by the gyro case, a magnetic element supported by said pendulum so as to be normally on the east-west tilt axis of the gyroscope, a second magnetic element adjacent to the first but mounted on the same axis on the phantom ring of the compass, said elements being adapted to exert on the gyro a couple around the vertical axis upon any lateral displacement of the pendulum consequent on tilting of gyroscope, said pendulum having an inconsequential mass as compared to the gravitational factor of the compass and a viscous damper to prevent vibrations of the pendulum.

3. A damper for gyroscopic compasses having a rotor casing supported for freedom about at least an east-west horizontal axis and a vertical axis, and a gravitational factor for imparting meridian-seeking properties, comprising a spring-constrained inverted small pendulum separate and apart from the gravitational factor mounted for displacement in a north-south plane upon tilt of said casing about said east-west axis, and means brought into action by such displacement for applying a torque about said vertical axis to reduce the tilt of the gyroscope about said east-west axis, said pendulum having an inconsequential mass as compared to the gravitational factor of the compass.

4. A damper for gyroscopic compasses having a rotor casing supported for freedom about at least an east-west horizontal axis and a vertical axis, and a gravitational factor for imparting meridian-seeking properties, comprising a spring-constrained inverted pendulum in addition to the gravitational factor of the compass mounted for displacement in a north-south plane upon tilt of said casing about said east-west axis, and torque means brought into action by such displacement for applying a torque about said vertical axis in a direction to reduce the tilt.

5. In a gyroscopic compass having a phantom ring and a closed circuit liquid ballistic, the lower part of which contains a heavy liquid which is free to flow between the north and south sides of the gyroscope, while the upper part contains a lighter liquid, a two-part liquid container having a movable wall in circuit with the liquid in the ballistic so arranged that on any displacement of the heavy liquid, said wall is displaced, and yielding means connecting said wall and said phantom ring in line with the horizontal axis of said gyroscope for applying a torque about the vertical axis of the compass upon tilt of the gyroscope about its horizontal axis.

6. In a gyroscopic compass having vertical and horizontal axes of support and a phantom ring and also having a closed circuit liquid ballistic, the lower part of which contains a heavy liquid which is free to flow between the north and south sides of the gyroscope, while the upper part contains a lighter liquid, a two-part liquid container having a movable wall in circuit with said lighter liquid so arranged that on any displacement of the heavy liquid, said wall is displaced, a magnetic element connected to said wall so as to be laterally displaced thereby, and a cooperating magnetic element fixed on the phantom ring adjacent to said first magnetic element.

7. A damping system for damping the oscillations in azimuth of a gyroscopic compass having a gravitational factor and a phantom ring comprising a spring-constrained inverted pendulum in addition to and acting independently of said gravitational factor and carried by the gyro casing, a yielding connection between said pendulum and the phantom ring in line with the horizontal axis of the gyroscope, said connection exerting on the gyroscope a couple around the vertical axis upon any lateral displacement of said pendulum upon tilting of the gyroscope.

8. A damping system for damping the oscillations in azimuth of a gyroscopic compass having a gravitational factor and a phantom ring comprising a spring-constrained inverted pendulum in addition to and acting independently of said gravitational factor and carried by the gyro casing, a magnetic element supported by said pendulum so as to be normally on the east-west tilt axis of the gyroscope, and a second magnetic element adjacent to the first but mounted on the same axis on the phantom ring of the compass, said elements being adapted to exert on the gyro a couple around the vertical axis upon any lateral displacement of the inverted pendulum consequent upon tilting of the gyroscope.

9. A damping system for damping the oscillations in azimuth of a ship's gyroscopic compass having a graviational factor comprising a spring-constrained pendulum in addition to and acting independently of said gravitational factor and carried by the gyro casing; a magnetic element supported by said pendulum so as to be normally in line with the east-west tilt axis of the gyroscope, a second magnetic element adjacent to the first also in line with said axis, but mounted on the phantom ring of the compass, said elements being adapted to exert on the gyro a couple around the vertical axis upon any lateral displacement of the pendulum consequent upon tilting of the gyroscope, and means whereby said magnetic elements may be rendered inoperative during turns of the ship.

10. In a gyroscopic compass having a follow-up element and a rotor casing; a gravitational element displaceable upon tilt of the gyroscope, a two-part magnetic damping element, one part being on said follow-up element and the other part displaced by said gravitational element, said parts exerting a mutual force acting about the vertical axis of the compass upon tilt of said gravitational element during the ordinary meridian seeking cycle involving limited displacement of said parts, but when said gravitational element is subject to acceleration pressures due to change of course or speed, said magnetic elements becoming so far separated as to exert little or no force about said vertical axis whereby the damping is substantially eliminated during substantial changes of speed or course.

11. In a gyroscopic compass having a follow-up element and a rotor casing; means for damping the oscillations of the compass in azimuth comprising a tilt responsive element carried by said casing and a pair of cooperating magnetic elements of which one is fixed to the follow-up element and one is carried by said casing, said magnetic elements being relatively displaced laterally by said tilt responsive element upon tilt of said casing whereby a couple round the vertical axis of said casing is exerted upon tilt of said casing.

12. A gyroscopic compass as claimed in claim 11, in which the attraction between said magnetic elements decreases for large displacements of said tilt responsive part whereby the damping is reduced during acceleration.

13. A gyroscopic compass as claimed in claim 10, in which said gravitational element includes a liquid ballistic also constituting a gravitational factor imparting meridian-seeking properties to the compass.

14. A gyro compass as claimed in claim 10, also having a second gravitational element which imparts meridian-seeking properties to the gyro separate and apart from said damping gravitational element.

LESLIE F. CARTER.

REFERENCES CITED

The following references are of record in the file of this patent:

UNITED STATES PATENTS

| Number | Name | Date |
|---|---|---|
| 1,686,524 | Hight | Oct. 9, 1928 |
| 1,730,967 | Carter | Oct. 8, 1929 |
| 1,773,412 | Thompson | Aug. 19, 1930 |
| 1,986,807 | Gillmor | Jan. 8, 1935 |
| 2,510,068 | Carter | June 6, 1950 |

FOREIGN PATENTS

| Number | Country | Date |
|---|---|---|
| 545,694 | Great Britain | June 9, 1942 |

OTHER REFERENCES

Publ.: "The Theory of the Gyroscopic Compass," 2d edition, published by MacMillan Co., N. Y., March 1944.